June 9, 1931. J. T. PEARSON 1,809,064

THREADLESS CONNECTER

Filed May 10, 1929

John T. Pearson
INVENTOR.

BY Bordell & Thompson
ATTORNEYS.

Patented June 9, 1931

1,809,064

UNITED STATES PATENT OFFICE

JOHN T. PEARSON, OF SYRACUSE, NEW YORK, ASSIGNOR TO CROUSE-HINDS COMPANY, OF SYRACUSE, NEW YORK, A CORPORATION OF NEW YORK

THREADLESS CONNECTER

Application filed May 10, 1929. Serial No. 362,008.

This invention relates to connectors for connecting pipes and the like where the pipe is not threaded. It relates more particularly to connectors for joining electrical conduits and connecting conduits to outlet boxes, junction boxes, electrical fixtures and the like, where it is impossible or impractical to thread the conduit.

The invention has for its object, a threadless connector that is easily and economically manufactured, easily and quickly applied and which forms a tight rigid joint.

The invention consists in the novel features and in the combinations and constructions hereinafter set forth and claimed.

In describing this invention, reference is had to the accompanying drawings in which like characters designate corresponding parts in all the views.

This threadless connector or coupling comprises an externally threaded body having a passage for receiving a conduit end, a contractile sleeve or collar having a portion of its surface beveled, which surface extends into and coacts with the bore of the passage, a nut which is adapted to be threaded upon the body and by tightening movement of the same, contracts the sleeve about the end of the conduit.

Figure 1:
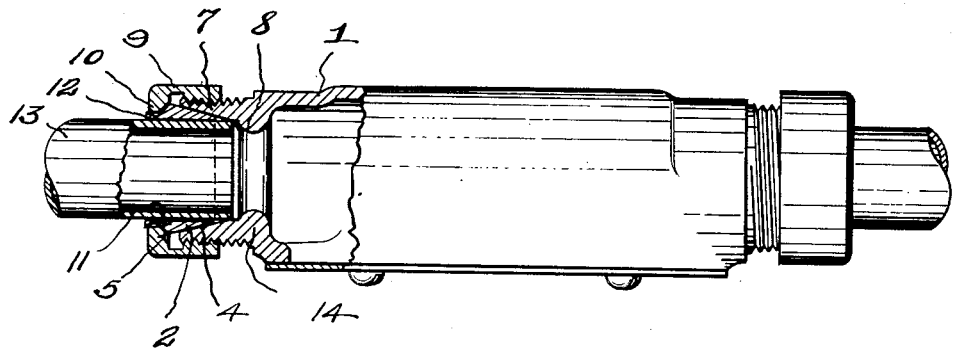
Figure 1 is a side elevation of a conduit junction box with threadless connectors formed at its conduit receiving ends, one end being in section.
Figure 2:
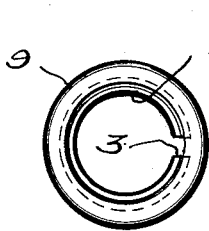
Figure 2 is an end elevation of the nut and contractile sleeve.

1 designates the body of the coupling, which, as shown in Figure 1, constitutes an extended end portion of a junction box for electrical conduits. This body may be formed tubular in shape and threaded at both ends providing a coupling for simply joining to conduits where no junction box is desired.

2 is the contractile sleeve.

Figure 3:
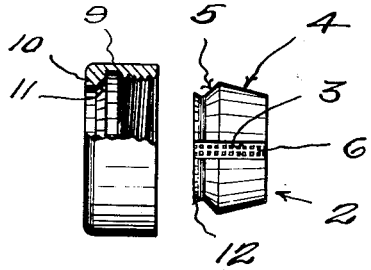
Figure 3 is a side elevation of the nut and sleeve separatively, the nut being partly in section.

This sleeve is circular in general contour and is separated or split at one side as indicated at 3. A portion of the outer surface of this sleeve is beveled as shown at 4 at an angle of fifteen degrees with the axis of the sleeve. Another portion designated 5 is tapered at an angle of forty-five degrees. The inside surface of the sleeve is knurled as shown through the slot 3, Figure 3, at 6.

The body 1 is threaded externally and has a bore which, at its outer end, is also tapered outwardly at an angle of fifteen degrees and at its inner end, it has a comparatively short straight bore, as indicated at 8. The straight portion of the bore is of such diameter that it will receive the end of a conduit.

9 designates a nut which is adapted to be threaded upon the body 1, and has an inner circumferential flange or shoulder 10, the inner surface of which, as indicated at 11, is beveled at an angle of forty-five degrees. The sleeve 2 and the nut 9 are secured together semi-permanently by an overturned end portion 12 of the sleeve 2. The sleeve is secured to the nut in this manner so that it may freely rotate within the nut and at the same time, is sufficiently secured to the nut as to prevent separation and probable loss of either the nut or the sleeve before the same are actually placed in operating position by the workman.

The end of the conduit 13 is secured to the body 1 as follows: the nut 9, with sleeve 2 secured thereto as heretofore described, is slipped over the end of the conduit, the bore of the sleeve being of such diameter as to readily pass over the end of the conduit. The conduit end is then inserted in the passage of the body 1, and the nut threaded on the body. Upon tightening the nut the sleeve 2 is drawn in the passage of the extension 7 and upon continued tightening of the nut, the sleeve is caused to contract by the wedge action between the surface 4 of the sleeve and the tapered bore of the passage and tightly grip the conduit. Upon further tightening of the nut, the conduit and the sleeve are moved endwise toward the body, until the end of the conduit engages the inner shoulder 14 of the body. At this time the end of the conduit is seated in the straight part of the bore of the passage. This feature alines the conduit and the body and also steadies the end of the conduit so that there will be no sagging at the joint.

It will be noted that the inner shoulder of the nut, which is beveled at forty-five degrees, coacts against that portion of the sleeve which is beveled at forty-five degrees. This angle being relatively great does not cause maximum contraction of the sleeve, but is instrumental in forcing the sleeve in the bore of the body 1.

That portion of the sleeve beveled at fifteen degrees coacts with the outer bore of the body which is also beveled at fifteen degrees, and because of this relatively small angle, a very efficient wedge action is established between the extension of the body and the sleeve which causes the sleeve to contract with a comparatively great force to that which is applied on the outer portion of the sleeve by the shoulder of the nut. In this manner, the sleeve exerts a tremendous gripping power upon the conduit and renders it impossible to rotate the same when in this position.

As the inner surface of the sleeve next to the conduit is knurled, a strong mechanical connection is established between the sleeve and the conduit end and also an efficient electrical ground connection.

This coupling has been repeatedly tested and found to secure a conduit end to a body in such manner that the conduit can not be turned in either direction. In addition to the named features, which I have outlined, I call attention to the fact that my construction permits all parts to be manufactured on a screw machine which greatly reduces the cost and increases the production.

What I claim is:

1. A conduit coupling comprising an externally threaded body having a tapered passage for receiving a conduit end, a conduit projecting into said passage and having its end in engagement with the tapered sides of said passage, a contractile sleeve surrounding the conduit adjacent the end thereof and extending into said passage, the sleeve and passage having coacting surfaces to contract the sleeve on the conduit end when the sleeve is forced into the passage, a nut threading on the body and having an internal flange thrusting against the sleeve to force it into the body during turning of the nut in one direction.

2. A conduit coupling comprising an externally threaded body having a conical passage, a conduit projecting into said passage and having its end in engagement with the tapered sides of said passage, a contractile sleeve surrounding the conduit adjacent the end thereof and extending into the passage and having a peripheral surface complemental to the conical surface of the body, a nut threading on the body and having an internal flange coacting with the sleeve, one of the coacting parts being formed with an annular groove and the other extending into the groove to interlock with the same, whereby the sleeve and the nut are interlocked against axial displacement of the sleeve relatively to the nut.

3. A conduit coupling comprising an externally threaded body having a tapered passage therethrough, a conduit projecting into said passage and having its end in engagement with the tapered sides of said passage, a contractile sleeve surrounding the conduit adjacent the end thereof and for receiving a conduit and extending into said passage, the engaging surfaces of the sleeve and the passage being formed to contract the sleeve as the sleeve is forced into the passage, a nut threading on the body and having an internal flange thrusting against the sleeve and interlocked therewith, the sleeve being formed with a peripheral groove into which the flange extends whereby the nut and the sleeve are interlocked against relative axial displacement in both directions, the wall of the groove, which receives the thrust when the nut is turned on the body, being formed tapered and the wall of the flange coacting therewith being complementally tapered.

In testimony whereof, I have hereunto signed my name, at Syracuse, in the county of Onondaga, and State of New York, this 7th day of May, 1929.

JOHN T. PEARSON.